United States Patent
Nguyen et al.

(10) Patent No.: US 11,485,419 B2
(45) Date of Patent: Nov. 1, 2022

(54) A-B REVERSE DOOR RING

(71) Applicants: MAGNA INTERNATIONAL INC., Aurora (CA); Anh Duy Nguyen, Royal Oak, MI (US); Vijay Daphale, Troy, MI (US)

(72) Inventors: Anh Duy Nguyen, Royal Oak, MI (US); Vijay Daphale, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 17/268,202

(22) PCT Filed: Aug. 12, 2019

(86) PCT No.: PCT/US2019/046100
§ 371 (c)(1),
(2) Date: Feb. 12, 2021

(87) PCT Pub. No.: WO2020/036841
PCT Pub. Date: Feb. 20, 2020

(65) Prior Publication Data
US 2021/0316794 A1  Oct. 14, 2021

Related U.S. Application Data

(60) Provisional application No. 62/718,505, filed on Aug. 14, 2018.

(51) Int. Cl.
*B62D 25/04* (2006.01)
*B62D 25/02* (2006.01)

(52) U.S. Cl.
CPC ............ *B62D 25/04* (2013.01); *B62D 25/025* (2013.01)

(58) Field of Classification Search
CPC ....... B62D 25/04; B62D 25/02; B62D 25/025; B62D 25/023
USPC ....... 296/23.01, 2, 3, 29, 30, 193.05, 193.06
See application file for complete search history.

(56) References Cited

U.S. PATENT DOCUMENTS

| | | |
|---|---|---|
| 6,447,052 B2 | 9/2002 | Saeki |
| 6,817,654 B2 | 11/2004 | Kitagawa et al. |
| 2011/0233970 A1 | 9/2011 | Nagai et al. |
| 2013/0187409 A1 | 7/2013 | Moll |
| 2016/0200364 A1 | 7/2016 | Redmer et al. |

*Primary Examiner* — Dennis H Pedder
(74) *Attorney, Agent, or Firm* — Dickinson Wright PLLC

(57) ABSTRACT

A reverse door ring assembly includes a door ring member of stamped metal with a generally ring shape to define an opening for a front door of a vehicle. The door ring member defines an A-pillar as a first sloping generally-upright portion extending to a roof edge and a B-pillar extending generally upright and transverse to the roof edge. The reverse door ring assembly includes an elongate member having a generally tubular shape extending along an exterior-facing side of the A-pillar of the door ring member on the door ring member. The reverse door ring assembly also includes a B-pillar outer member secured on an exterior-facing side of the B-pillar. The reverse door ring assembly also includes a front reinforcement upper-outer member mounted on an exterior-facing side of the second door ring member at a lower end of the A-pillar, together defining a Y-shaped cradle holding the A-pillar tube.

19 Claims, 4 Drawing Sheets

A-B REVERSE DOOR RING

CROSS-REFERENCE TO RELATED APPLICATION

This U.S. National Stage Patent Application claims the benefit of PCT International Patent Application Serial No. PCT/US2019/046100 filed Aug. 12, 2019 entitled "A-B Reverse Door Ring" which claims the benefit of and priority to U.S. Provisional Patent Application Ser. No. 62/718,505 filed on Aug. 14, 2018, titled "A-B Reverse Door Ring," the entire disclosure of which is hereby incorporated by reference.

FIELD

The present disclosure relates generally to a design structural metal parts for a portion of a body of a motor vehicle. More specifically, the present disclosure relates to design of sheet metal parts for a door ring surrounding a front door opening of a passenger vehicle.

BACKGROUND

Various different designs exist using different combinations of structural metal parts to make a door ring surrounding and defining a front door opening of a passenger vehicle, such as a car or truck. Several different design considerations include those pertinent to the finished vehicle, such as weight, roof crush strength, and side impact performance. Additional design considerations relate to the feasibility and economics of manufacturing, which include cost of materials, and manufacturability.

SUMMARY

The present disclosure provides a reverse door ring assembly for a vehicle, which includes a door ring member defining an interior face and an exterior face opposite of the interior face. The door ring member has a thickness between an inner bodyside and an outer bodyside spaced apart from the inner bodyside. The door ring member includes a sill and a bulkhead extending perpendicularly from a front end of the sill. The bulkhead defines an upper portion spaced apart from the sill. The door ring member also includes an A-pillar base sloping upwardly from the bulkhead to a roof edge. The door ring member includes a B-pillar base extending from the sill to the roof edge. The reverse door ring assembly also includes an elongate member having a tubular shape disposed adjacent the exterior face of the door ring member and extending along the A-pillar base.

According to another aspect, a reverse door ring assembly for a vehicle includes a door ring member defining an interior face and an exterior face opposite of the interior face. The door ring member has a thickness between an inner bodyside and an outer bodyside spaced apart from the inner bodyside. The door ring member includes a bulkhead defining an upper portion. The door ring member also includes an A-pillar base sloping upwardly from the bulkhead to a roof edge. The door ring member also includes a B-pillar base extending perpendicularly to the roof edge. The reverse door ring assembly also includes an elongate member disposed adjacent the exterior face of the door ring member and extending along the A-pillar base. The reverse door ring assembly also includes a B-pillar outer member secured on the exterior face of the door ring member and covering the B-pillar base.

BRIEF DESCRIPTION OF THE DRAWINGS

Further details, features and advantages of designs of the invention result from the following description of embodiment examples in reference to the associated drawings.

DETAILED DESCRIPTION

Figure 1A:
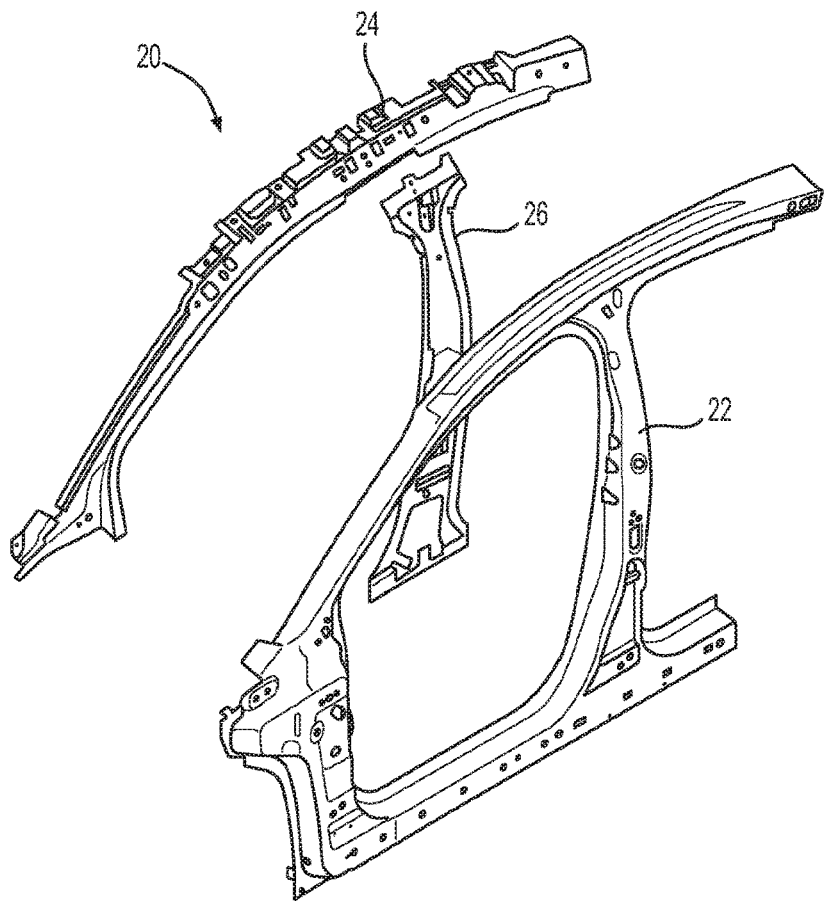
FIG. 1A is an exploded view of a door ring assembly of the prior art
Figure 1B:
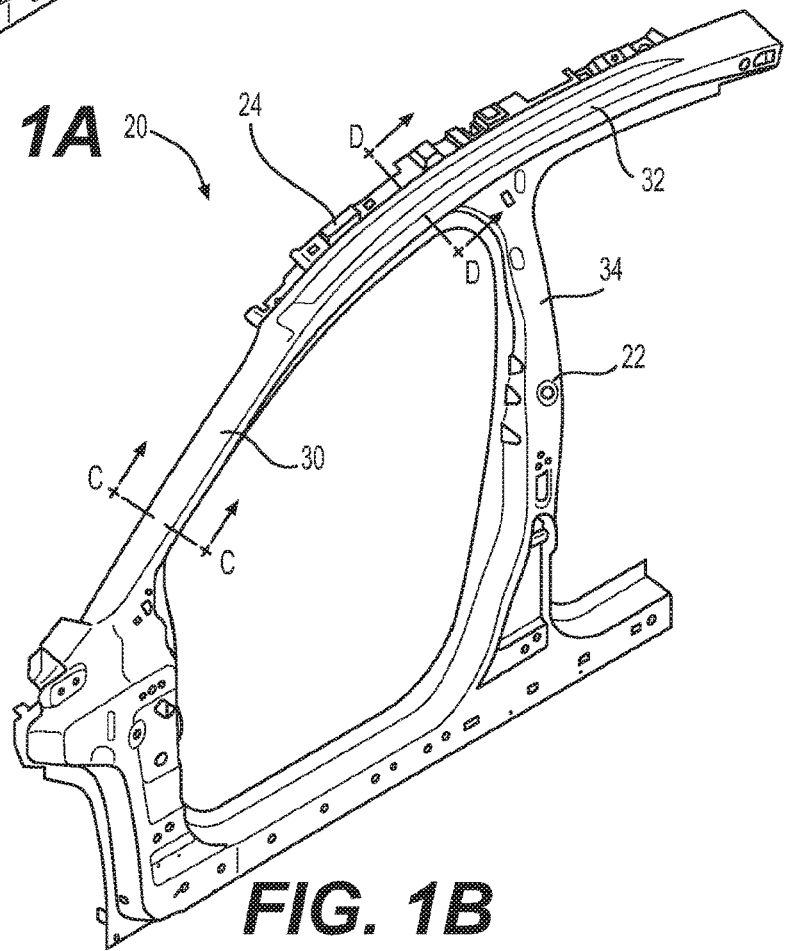
FIG. 1B is profile view of the door ring assembly of FIG. 1A.

Recurring features are marked with identical reference numerals in the figures, in which an example embodiment of a reverse door ring for a vehicle, such as a passenger car or truck, is disclosed.

The reverse door ring provides several advantages over door ring assemblies of the prior art. It allows for a lighter weight bodyside structure to be constructed with equivalent performance, such as strength against roof crush (rollover) loads and resilience to side-impacts. The transition between the inner bodyside to outer bodyside and vice-versa provides structural unity in bodyside components. Material at the transition portion may act as a bulkhead reinforcement.

FIGS. 1A-1D illustrate a door ring assembly 20 of the prior art. The door ring assembly 20 includes a first door ring member 22 of stamped structural metal, such as steel or aluminum, with a generally ring shape to define a generally trapezoidal opening for a front door of the vehicle. The door ring assembly 20 includes including an A-pillar 30 as a first sloping generally-upright portion extending to a roof edge 32, which is generally horizontal when the door ring assembly 20 in its installed orientation upright within a vehicle body. The door ring assembly 20 also includes a B-pillar 34 extending generally upright and transverse to the roof edge 32.

Figure 1C:
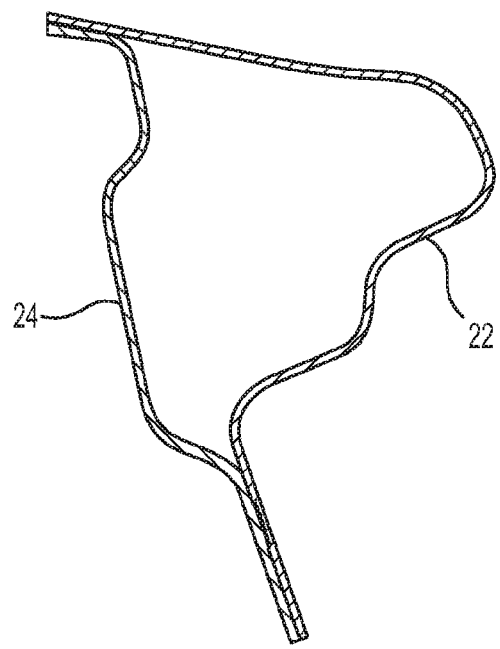
FIG. 1C is an enlarged cross-sectional view of the door ring assembly of FIG. 1B along line C-C.
Figure 1D:
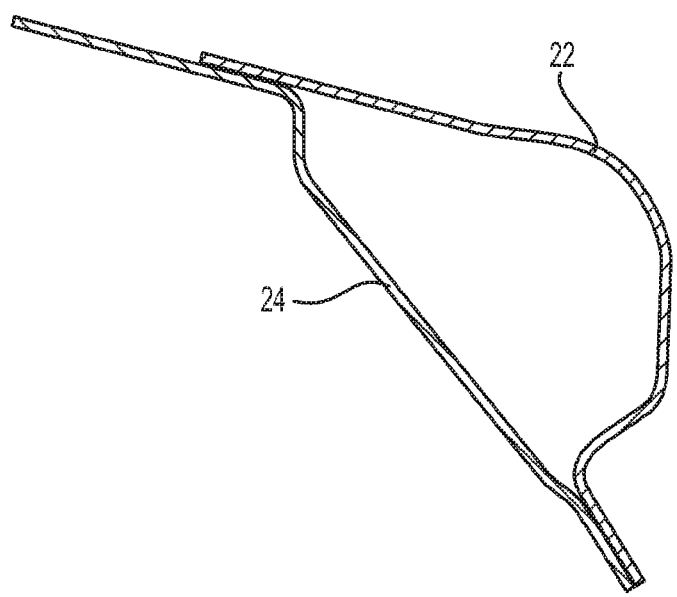
FIG. 1D is an enlarged cross-sectional view of the door ring assembly of FIG. 1A along line D-D.

The door ring assembly 20 includes an A-pillar inner member 24 having a generally flat and elongated shape and extending along an inner side of the first door ring member 22 along the A-pillar and the roof edge 32 and joined together with the first door ring member 22, for example by welding, in a clamshell arrangement to form a tubular shape shown in the cross-sectional views of FIGS. 1C and 1D. The door ring assembly 20 also includes a B-pillar inner member 26 that is joined to an inner side of the first door ring member 22 along the upright B-pillar between a lower sill and to the roof edge 32. The B-pillar inner member 26 is joined together with the first door ring member 22, for example by welding, in a clamshell arrangement to form a tubular shape. In the door ring assembly 20, each of the A-pillar inner member 24 and the B-pillar inner member 26 are joined to the inner side of the first door ring member 22, which is the side that faces the interior space of the vehicle when the door ring assembly 20 joined with other structural components to form a vehicle body.

As shown in FIGS. 2A-2D, the reverse door ring assembly 120 of the present disclosure includes a door ring member 122 of structural metal, such as steel or aluminum, with a generally ring shape to define a generally trapezoidal opening for a front door of the vehicle. The door ring member 122 may be formed from a monolithic piece, tailor-welded blank (TWB), or a C-Ring construction. The reverse door ring assembly 120 of the present disclosure includes a similar overall structure as the door ring assembly 20 shown in FIGS. 1A-1B, including an opening bounded by an A-pillar 30 and a B-pillar 34.

Figure 2A:
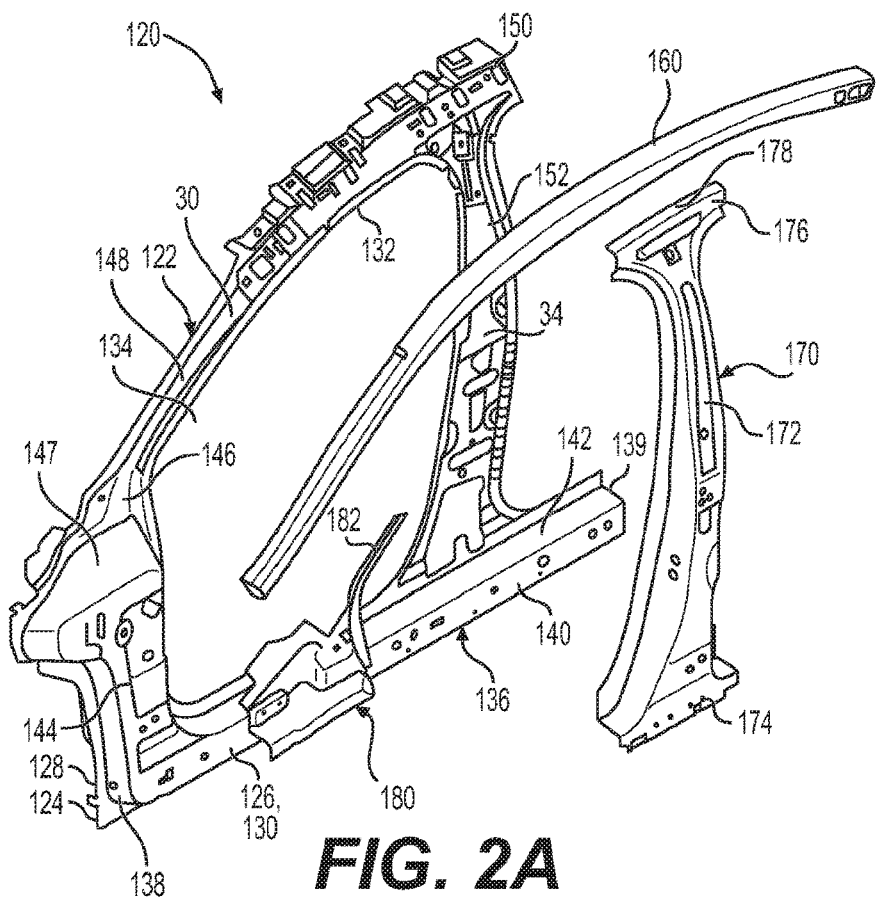
FIG. 2A is an exploded view of a reverse door ring assembly of the present disclosure.
Figure 2B:
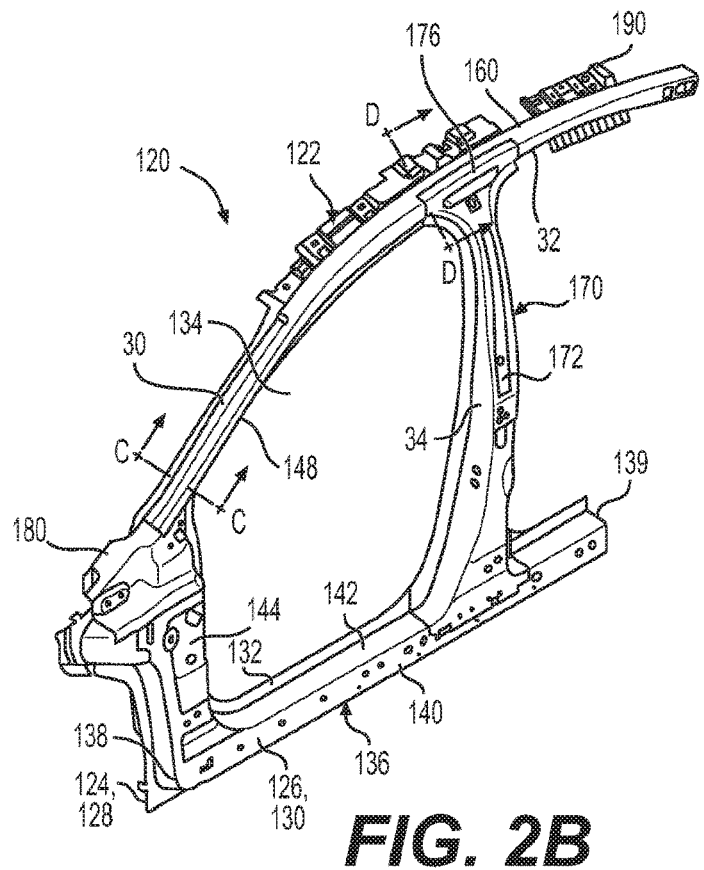
FIG. 2B is profile view of the reverse door ring assembly of FIG. 2A.

As shown in FIGS. 2A-2B, the door ring member 122 defines an interior face 124 that faces inwardly toward an interior of an assembled vehicle body that includes the reverse door ring assembly 120. The door ring member 122 also defines an exterior face 126 opposite of the interior face 124, or facing the exterior of the assembled vehicle. The door ring member 122 has a thickness between an inner bodyside 128 and an outer bodyside 130 that extends parallel to and spaced apart from the inner bodyside 128. The door ring member 122 includes a frame portion 132 extending in a plane along the inner bodyside 128 and surrounding an opening 134 for a door of the vehicle. The frame portion 132 may form a sealing surface or a structural foundation for such a sealing surface for a door. The door ring member 122 also includes a sill 136 extending in a straight line between a front end 138 and a rear end 139. In some embodiments, the sill 136 may have a C-shaped cross section or a rectangular cross-section that includes a side wall 140 defining the outer bodyside 130 and extending parallel to and spaced apart from the frame portion 132. The sill 136 also includes a ledge 142 extending perpendicularly from the side wall 140 to the inner bodyside 128.

The door ring member 122 also includes a bulkhead 144 extending perpendicularly from the front end 138 of the sill 136 and defining an upper portion 146 spaced apart from the sill 136. The upper portion 146 of the bulkhead 144 includes a shoulder 147 that slopes inwardly and upwardly from the outer bodyside 130 closest to the sill 136 to the inner bodyside 128 away from the sill 136. The door ring member 122 includes an A-pillar base 148 that slopes upwardly from the upper portion 146 of the bulkhead 144 to a roof edge 150 that is parallel to and spaced apart from the sill 136. The roof edge 150 is generally horizontal when the reverse door ring assembly 120 in its installed orientation on a vehicle body. The A-pillar base 148, thus forms a base portion of the A-pillar of the vehicle. The door ring member 122 also includes a B-pillar base 152 that extends from the sill 136 to the roof edge 150. In some embodiments, and as shown in FIGS. 2A-2B, the B-pillar base 152 extends perpendicularly to the sill 136. However, in other embodiments, the B-pillar base 152 may extend at an oblique angle to the sill 136.

The reverse door ring assembly 120 also includes an elongate member 160 disposed adjacent the exterior face 126 of the door ring member 122 and extending along the A-pillar base 148 across the B-pillar base 152 and along the roof edge 150 there beyond. In some embodiments, the elongate member 160 has a tubular shape. More specifically, the elongate member 160 may have a closed cross-section, such as an O-shape or a D-shape for substantially an entire length thereof. For example, the elongate member 160 may have a closed cross-section for the entire length except for a few ports or holes therethrough. In other embodiments, the elongate member 160 may have a C-shaped cross-section. The elongate member 160 may be formed of steel, aluminum, or carbon fiber. The elongate member 160 may be formed by any suitable means such as, for example, hot metal gas forming hydro-forming, roll form, or extrusion.

As shown in FIGS. 2A-2B, the reverse door ring assembly 120 also includes a B-pillar outer member 170 secured on the exterior face 126 of the door ring member 122 and covering the B-pillar base 152. In some embodiments, the B-pillar outer member 170 defines a T-shape with a body portion 172 extending along the B-pillar base 152 from a bottom portion 174 to a top portion 176. The bottom portion 174 surrounds and engages the sill 136, and the top portion 176 extends along the roof edge 150. In some embodiments, the B-pillar outer member 170 defines a generally I-shaped profile, which may include the T-shape, with the bottom portion 174 extending perpendicularly to the body portion 172.

In some embodiments, each of the elongate member 160 and the B-pillar outer member 170 are joined to the exterior face 126 of the door ring member 122, which is the side facing outwardly, away from the interior of the vehicle when the reverse door ring assembly 120 is joined with other structural components to form a vehicle body.

Figure 2C:
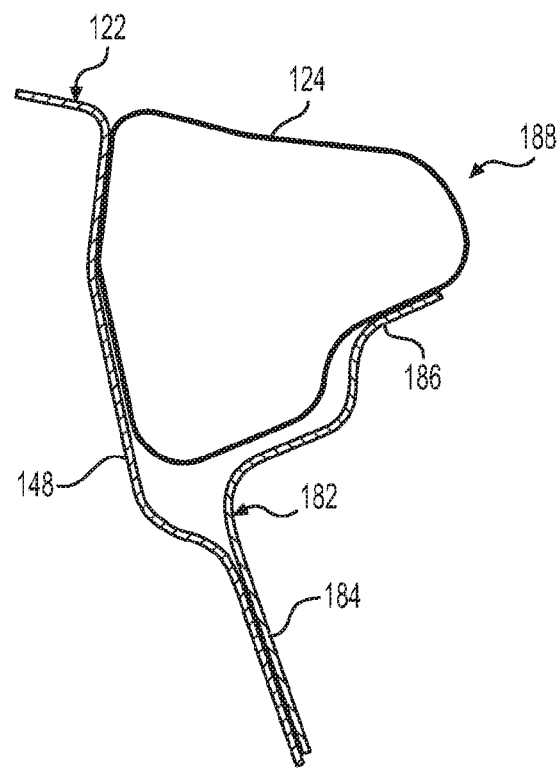
FIG. 2C is an enlarged cross-sectional view of the reverse door ring assembly of FIG. 2B along line C-C.
Figure 2D:
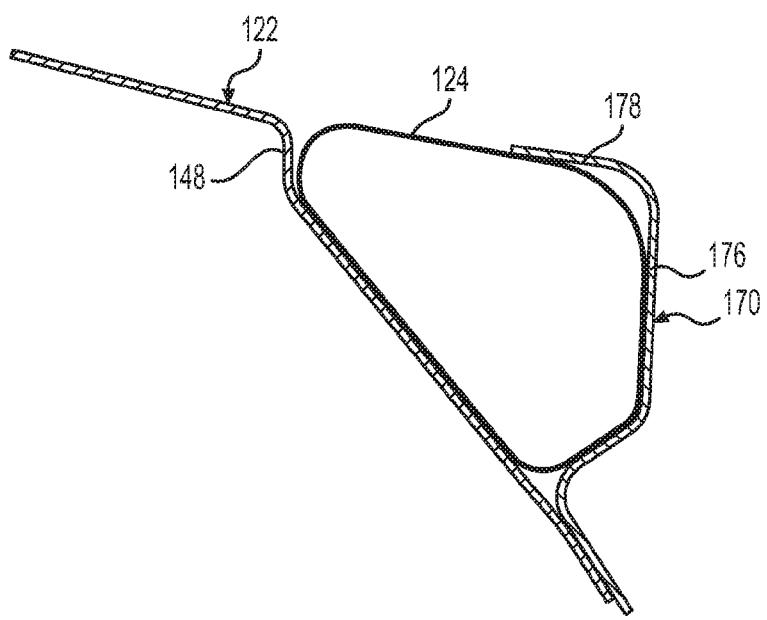
FIG. 2D is an enlarged cross-sectional view of the reverse door ring assembly of FIG. 2B along line D-D.

In some embodiments, and as shown in FIG. 2D, the top portion 176 of the B-pillar outer member 170 covers the elongate member 160 with the elongate member 160 disposed between the door ring member 122 and the B-pillar outer member 170. In some embodiments, the top portion 176 of the B-pillar outer member 170 defines a rim 178 that extends inwardly toward the door ring member 122 and wraps over a top of the elongate member 160 at the roof edge 150. Thus, the top portion 176 of the B-pillar outer member 170 at least partially encapsulates the elongate member 160, thus providing a stronger joint.

As shown in FIGS. 2A-2B, the reverse door ring assembly 120 also includes a front reinforcement member 180 that is on the exterior face 126 of the door ring member 122 on the upper portion 146 of the bulkhead 144 and overlying the shoulder 147 of the of the bulkhead 144. A support arm 182 extends from the front reinforcement member 180 along the A-pillar base 148 of the door ring member 122. The support arm 182 also extends along and supports the elongate member 160. As shown in FIG. 2C, The support arm 182 includes a lower wall 184 and a shelf portion 186 extending outwardly therefrom, with the lower wall 184 extending along and adjacent to the A-pillar base 148 of the door ring member 122. The shelf portion 186 of the front reinforcement member 180 and the A-pillar base 148 of the door ring member 122 together define a cradle 188 with a Y-shaped cross section holding the elongate member 160 with the elongate member 160 disposed upon the shelf portion 186 of the front reinforcement member 180 and along the A-pillar base 148 of the door ring member 122.

In some embodiments, and as shown in FIG. 2B, the reverse door ring assembly 120 also includes a roof support plate 190 fixed to the elongate member 160 at the roof edge 150 spaced away from the A-pillar base 148. In other words, the roof support plate 190 is fixed to the elongate member 160 at a part of the elongate member 160 rearward of the B-pillar. The roof support plate 190 is configured to secure the elongate member 160 to a vehicle structure. The vehicle structure may include, for example, metal roof panels and/or structural elements, such as stamped metal beams forming all or part of a rear door opening.

The reverse door ring assembly 120 of the present disclosure may include its component pieces, including one or more of the door ring member 122, the elongate member 160, the B-pillar outer member 170, the front reinforcement member 180, and the roof support plate 190 joined together by any suitable welding process such as, for example, a structural adhesive, spot welding, laser welding, and/or mig-welding. Two or more different welding processes may be used in constructing the reverse door ring assembly 120.

The reverse door ring assembly 120 of the present disclosure is optimized for crash performance by including four walls at each of the front A-pillar joint as shown in the detail of FIG. 2C and the upper B-pillar joint as shown in the detail of FIG. 2D.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reverse door ring assembly for a vehicle comprising:
    a door ring member defining an interior face and an exterior face opposite of the interior face, the door ring member having a thickness between an inner bodyside and an outer bodyside spaced apart from the inner bodyside, the door ring member including a sill and a bulkhead extending perpendicularly from a front end of the sill and defining an upper portion spaced apart from the sill, the door ring member including an A-pillar base sloping upwardly from the bulkhead to a roof edge, the door ring member including a B-pillar base extending from the sill to the roof edge; and
    an elongate member having a tubular shape disposed adjacent the exterior face of the door ring member and extending along the A-pillar base;
    a front reinforcement member secured on the exterior face of the door ring member on the upper portion of the bulkhead, wherein the upper portion of the bulkhead defines a shoulder sloping inwardly from the outer bodyside toward the inner bodyside; and
    wherein the front reinforcement member overlies the shoulder of the bulkhead.

2. The reverse door ring assembly of claim 1, wherein the elongate member extends across the B-pillar base and continues along the roof edge beyond the A-pillar base.

3. The reverse door ring assembly of claim 1, further comprising a B-pillar outer member secured on the exterior face of the door ring member and covering the B-pillar base.

4. The reverse door ring assembly of claim 3, wherein the sill includes a side wall defining the outer bodyside and a ledge extending perpendicularly from the side wall to the inner bodyside; and
    wherein the B-pillar outer member includes a bottom portion that extends along and around the sill, the bottom portion extending across the ledge and along and adjacent to the side wall of the sill.

5. The reverse door ring assembly of claim 3, wherein the B-pillar outer member defines a T-shape with a body portion extending along the B-pillar base from a bottom portion adjacent to the sill to a top portion, the top portion extending along the roof edge.

6. The reverse door ring assembly of claim 3, wherein the B-pillar outer member includes a top portion spaced apart from the sill; and
    wherein the top portion of the B-pillar outer member covers the elongate member with the elongate member disposed between the door ring member and the B-pillar outer member.

7. The reverse door ring assembly of claim 6, wherein the top portion of the B-pillar outer member defines a rim extending inwardly toward the door ring member and wrapping over a top of the elongate member at the roof edge.

8. The reverse door ring assembly of claim 1, further comprising a support arm extending from the front reinforcement member along the A-pillar base of the door ring member.

9. The reverse door ring assembly of claim 8, wherein the support arm extends along and supports the elongate member.

10. The reverse door ring assembly of claim 8, wherein the support arm includes a lower wall and a shelf portion extending outwardly therefrom, with the lower wall extending along and adjacent to the A-pillar base of the door ring member; and
    wherein the support arm and the A-pillar base of the door ring member together define a cradle with a Y-shaped cross section holding the elongate member therein.

11. The reverse door ring assembly of claim 1, further comprising a roof support plate fixed to the elongate member at the roof edge and configured to secure the elongate member to a vehicle structure of the vehicle.

12. A reverse door ring assembly for a vehicle comprising:
    a door ring member defining an interior face and an exterior face opposite of the interior face, the door ring member having a thickness between an inner bodyside and an outer bodyside spaced apart from the inner bodyside, the door ring member including a bulkhead defining an upper portion, the door ring member including an A-pillar base sloping upwardly from the bulkhead to a roof edge, the door ring member including a B-pillar base extending perpendicularly to the roof edge, wherein the upper portion of the bulkhead defines a shoulder sloping inwardly from the outer bodyside toward the inner bodyside;
    an elongate member disposed adjacent the exterior face of the door ring member and extending along the A-pillar base; and
    a B-pillar outer member secured on the exterior face of the door ring member and covering the B-pillar base, wherein the B-pillar outer member includes a top portion covering the elongate member, with the elongate member disposed between the door ring member and the B-pillar outer member, and wherein the top portion of the B-pillar outer member defines a rim extending inwardly toward the door ring member and wrapping over a top of the elongate member at the roof edge; and
    a front reinforcement member secured on the exterior face of the door ring member and overlying the shoulder of the bulkhead.

13. The reverse door ring assembly of claim 9, further comprising a support arm extending from the front reinforcement member along the A-pillar base of the door ring member.

14. The reverse door ring assembly of claim 13, wherein the support arm includes a lower wall and a shelf portion extending outwardly therefrom, with the lower wall extending along and adjacent to the A-pillar base of the door ring member; and wherein the support arm and the A-pillar base of the door ring member together define a cradle with a Y-shaped cross section holding the elongate member therein.

15. A reverse door ring assembly for a vehicle comprising:
a door ring member defining an interior face and an exterior face opposite of the interior face, the door ring member having a thickness between an inner bodyside and an outer bodyside spaced apart from the inner bodyside, the door ring member including a sill and a bulkhead extending perpendicularly from a front end of the sill and defining an upper portion spaced apart from the sill, the door ring member including an A-pillar base sloping upwardly from the bulkhead to a roof edge, the door ring member including a B-pillar base extending from the sill to the roof edge; and
an elongate member having a tubular shape disposed adjacent the exterior face of the door ring member and extending along the A-pillar base;
a front reinforcement member secured on the exterior face of the door ring member on the upper portion of the bulkhead;
a support arm extending from the front reinforcement member along the A-pillar base of the door ring member, the support arm extending along and supporting the elongate member.

16. The reverse door ring assembly of claim 15, wherein the upper portion of the bulkhead defines a shoulder sloping inwardly from the outer bodyside toward the inner bodyside; and
wherein the front reinforcement member overlies the shoulder of the bulkhead.

17. The reverse door ring assembly of claim 15, wherein the support arm includes a lower wall and a shelf portion extending outwardly therefrom, with the lower wall extending along and adjacent to the A-pillar base of the door ring member; and
wherein the support arm and the A-pillar base of the door ring member together define a cradle with a Y-shaped cross section holding the elongate member therein.

18. The reverse door ring assembly of claim 15, further comprising: a B-pillar outer member secured on the exterior face of the door ring member and covering the B-pillar base, the B-pillar outer member including a top portion spaced apart from the sill; and
wherein the top portion of the B-pillar outer member covers the elongate member with the elongate member disposed between the door ring member and the B-pillar outer member.

19. The reverse door ring assembly of claim 18, wherein the top portion of the B-pillar outer member defines a rim extending inwardly toward the door ring member and wrapping over a top of the elongate member at the roof edge.

* * * * *